3,183,123
FUEL CELL ELECTRODE
Daniel T. Haworth, Milwaukee, Wis., assignor to Allis-Chalmers Manufacturing Company, Milwaukee, Wis.
No Drawing. Filed Mar. 19, 1962, Ser. No. 180,852
4 Claims. (Cl. 136—86)

This invention relates generally to fuel cells and more particularly to improved components for fuel cells and the like and to novel methods of making the same.

Much of the effort being expended in fuel cell research is directed toward the development of catalyst activated fuel cell electrodes which do not require the use of costly noble metals, especially platinum and palladium, as the catalyst materials and yet do not sacrifice the output characteristics which the noble metals obtain. Heretofore, electrodes carrying catalytic platinum have been generally preferred for obtaining maximum output characteristics in both the gaseous fuel cells such as disclosed by Mond et al., U.S. 409,365, and in the liquid-gas fuel cells such as disclosed by Justi et al., U.S. 2,925,454. However, the cost of using such dear materials has been a major factor in preventing fuel cells from attaining commercial acceptance in other than governmental work.

A further problem which arises in connection with the design of the oxidant electrode (herein called "cathode") for the liquid-gas system has been to find a catalyst which will activate the oxidant but which will not be reactive with the fuel which surrounds it.

The present invention is predicated upon my design of a novel cathode structure which not only attains commercially practicable outputs while using a catalyst of a non-noble metal, but which also exploits the unexpected result that the preselected non-noble metal catalysts are selective of the oxidant and inert to the fuel when employed in liquid-gas fuel cells. Thus, an electrode manufactured in accordance with the present invention is equally suited to both gas and liquid-gas fuel cells and great advantages are realized from the utilization of the electrode in both types of cells.

Accordingly, one of the primary objects of the present invention is the provision of a novel electrode structure which is readily prepared and which is significantly less costly than those prior art electrodes heretofore utilizing noble metal catalysts.

Another object of the present invention is the provision of an improved cathode which is equally well suited for use with both gas and liquid-gas type fuel cells.

It is still a further object of the present invention to provide an improved method of preparing fuel cell cathodes in which the catalytic active agent is formed directly on and in the electrode base structure.

A still further object of the present invention is the provision of a novel cathode having a cathodic catalyst which is selected from the group consisting of the borides of cobalt and nickel.

These and still further objects, as shall herein after appear, are attained by the present invention in a remarkably unexpected fashion as can be discerned from the following detailed description of representative embodiments of the present invention. It is, of course, understood that the representative embodiments are herein presented for purposes of illustration rather than limitation.

In practicing the method of the present invention, a porous electrode base formed of a suitable electrically conductive material such, for example, as carbon or nickel, is immersed into and substantially saturated by a solution containing a soluble salt of a metal selected from the group consisting of nickel, cobalt, and mixtures thereof. Suitable soluble salts for forming an aqueous solution for this purpose include the chlorides, acetates, bromides, and nitrates of both cobalt and nickel as well as mixtures of these with each other or with other soluble salts.

The electrode base, thus substantially saturated, is removed from the salt solution and dipped into a second solution containing a borohydride selected from the group consisting of the alkali metals, that is, sodium, potassium, lithium, cesium, and rubidium, or a mixture of at least two of these. Of these, only lithium, sodium and potassium are available commercially and, because of lithium's high reactivity, sodium and potassium are preferred. As soon as the base enters this second solution, a reaction commences between the aqueous salt, for example, nickel chloride, and the borohydride, for example, sodium borohydride. The reaction products are sodium chloride, hydrogen (which passes off) and nickel boride which forms in and on and adheres to the electrode base. The electrode base is then removed from the second solution and rinsed to remove the sodium chloride and any unreacted borohydride that may cling to the base. Because of the great disparity in solubility between the salt and the nickel (or cobalt) boride, water may be used for a rinsing medium.

In this simple and readily achieved manner, a novel electrode structure is formed comprising a porous electrically conductive base which carries within its pores and on its surface a large plurality of active centers of the catalytic boride.

The procedure, as described, is the same regardless of whether the porous base is carbon or nickel and irrespective of the specific soluble salt of cobalt or nickel selected for the first bath. Similarly, the borohydride may be any alkali borohydride, but preferably of sodium or potassium, without departing from the method described.

The electrode thus formed provides highly desirable results when utilized as the cathode in both gas and liquid-gas cells as appears in the data reported below.

An alternative method of manufacturing electrode plaques to exploit the novel characteristics which I have discovered for the borides of nickel and cobalt, but which does not create the many internal catalytic centers described above, shall now be described.

In this procedure, which is admittedly less desirable for certain application, I react my aqueous solution of a salt of cobalt or nickel, of the type previously described, with the alkali borohydride in a separate reactor vessel. A voluminous precipitate, black both in the case of nickel boride and cobalt boride, is formed with the evolution of hydrogen. The boride can then be filtered from the solution and washed free of the excess borohydride and salts. The boride precipitate, somewhat pasty in consistency, can then be spread onto the surface of the electrode base as with a knife or doctor blade or other suitable spread technique. After spreading a relatively uniform coat of the boride on the electrode base, the coating is permitted to dry.

The electrode prepared by spreading the boride upon the base also provides satisfactory results in the operation of the fuel cells but it is not the full equivalent of the electrode prepared by causing the boride to form directly on the base.

To further aid in the complete understanding of the present invention, the following examples are presented to exemplify rather than limit the practice thereof.

*Example I*

A test cell was constructed using a cathode manufactured in accordance with the present invention from a porous carbon plaque which carried 27.3 mg. of cobalt boride per square inch of surface area. The anode was formed from a carbon plaque having spread thereupon a layer of platinum on a layer of palladium. The electrolyte was 25 percent potassium hydroxide which was soaked into an asbestos spacer interposed between the anode and the cathode. The fuel was hydrogen and the oxidant was oxygen. The cell produced an open circuit voltage of 1.00 volt and the following current-voltage characteristics (where "E" represents volts and "I" represents amps/ft.²):

| E | .86 | .80 | .74 | .70 | .61 | .42 | .22 |
|---|-----|-----|-----|-----|-----|-----|-----|
| I | 1.4 | 4.3 | 7.2 | 10.1 | 14.4 | 29 | 43 |

*Example II*

A test cell was constructed using a cathode manufactured in accordance with the present invention from a porous nickel plaque which carried 90.3 mg. of cobalt boride per square inch of surface area. The anode was formed from a nickel plaque having a catalyst layer of platinum spread thereupon. The electrolyte was 25 percent potassium hydroxide which was soaked into an asbestos spacer interposed between the anode and the cathode. The fuel was hydrogen and the oxidant was oxygen. The cell produced an open circuit voltage of 0.97 volt. The current-voltage characteristics of the test cell are reported below.

| E | 0.80 | 0.70 | 0.60 | 0.05 |
|---|------|------|------|------|
| I | 5.7 | 10.4 | 15.0 | 40.3 |

*Example III*

A test cell was constructed using a cathode manufactured in accordance with the present invention from a porous carbon plaque which carried 19.1 mg. of cobalt boride per square inch of surface area. The anode was formed from a carbon plaque which was coated with a layer of palladium and a subsequent layer of platinum. The electrolyte was 25 percent potassium hydroxide which was soaked into an asbestos spacer interposed between the anode and the cathode. The fuel was hydrogen and the oxidant was oxygen. The cell produced an open circiut voltage of 0.99 volt. The current-voltage characteristics of the cell are below.

| E | .86 | .80 | .76 | .70 | .60 | .38 | .23 |
|---|-----|-----|-----|-----|-----|-----|-----|
| I | 1.4 | 4.3 | 5.7 | 8.6 | 14.4 | 29 | 40 |

*Example IV*

A test cell was constructed using a porous carbon plaque for a cathode. The anode was formed from a carbon plaque which was prepared as in Example III. The electrolyte was 25 percent potassium hydroxide which was soaked into an asbestos spacer interposed between the anode and the cathode. The fuel was hydrogen and the oxidant was oxygen. The cell produced an open circuit voltage of 0.90 volt. The current-voltage characteristics of the cell are below.

| E | .78 | .68 | .63 | .52 | .42 | .13 |
|---|-----|-----|-----|-----|-----|-----|
| I | 1.4 | 4.3 | 5.7 | 8.6 | 11.5 | 23 |

*Example V*

A test cell was constructed using a cathode manufactured in accordance with the present invention from a porous carbon plaque upon which was spread 19.1 mg. of cobalt boride per square inch of surface area. The anode was formed from a carbon plaque having spread thereupon a layer of platinum superposed with a layer of palladium. The electrolyte was 25 percent potassium hydroxide. The fuel was methanol and the oxidant was oxygen. The cell produced an open circuit voltage of 0.81 volt. The current-voltage characteristics of the test cell are below.

| E | .65 | .53 | .38 | .30 | .08 |
|---|-----|-----|-----|-----|-----|
| I | 1.4 | 2.9 | 5.7 | 7.2 | 14.4 |

*Example VI*

A test cell was constructed using a cathode manufactured in accordance with the present invention from a porous carbon plaque upon which was formed 14.0 mg. of cobalt boride per square inch of surface area. The anode was formed from a carbon plaque having a layer of platinum superposed with a layer of palladium spread thereupon. The electrolyte was 25 percent potassium hydroxide which was soaked into an asbestos spacer interposed between the anode and the cathode. The fuel was gaseous ammonia and the oxidant was oxygen. The cell produced an open circuit voltage of 0.54 volt. The current-voltage characteristics of the test cell are below.

| E | 0.48 | 0.41 | 0.38 | 0.27 | 0.14 |
|---|------|------|------|------|------|
| I | 1.4 | 4.3 | 7.2 | 14.4 | 21.6 |

*Example VII*

A test cell was constructed using a cathode manufactured in accordance with the present invention from a porous nickel plaque which carried 73.4 mg. of cobalt boride per square inch of surface area. The anode was formed from a nickel plaque having a catalyst layer of platinum spread thereupon. The electrolyte was 25 percent potassium hydroxide which was soaked into an asbestos spacer interposed between the anode and the cathode. The fuel was hydrogen and the oxidant was oxygen. The cell obtained an open circuit voltage of 0.96 volt. The current-voltage characteristics of the test cell are below.

| E | 0.80 | 0.70 | 0.60 | 0.06 |
|---|------|------|------|------|
| I | 6.4 | 11.4 | 16.3 | 43 |

*Example VIII*

A test cell was constructed using a cathode manufactured in accordance with the present invention from a porous nickel plaque which carried 90.3 mg. of cobalt boride per square inch of surface area. The anode was formed from a nickel plaque having a catalyst layer of platinum spread thereupon. The electrolyte was 25 percent potassium hydroxide. The fuel was methanol and the oxidant was oxygen. The cell obtained an open circuit voltage of 0.80 volts. The current-voltage characteristics of the test cell are below.

| E | .70 | .63 | .57 | .51 | .48 | .45 | .42 | .38 | .35 | .23 | .11 |
|---|-----|-----|-----|-----|-----|-----|-----|-----|-----|-----|-----|
| I | 1.4 | 2.9 | 4.3 | 5.7 | 7.2 | 8.6 | 10.1 | 11.5 | 14.4 | 21.6 | 28.8 |

*Example IX*

A test cell was constructed having a cathode of porous nickel into which was precipitated 164 mg. of nickel boride per each square millimeter of surface area. The anode was a carbon plaque upon which a layer of palladium was deposited and covered with a layer of platinum. The electrolyte was 25 percent potassium hydroxide which was soaked into an asbestos spacer interposed between the anode and the cathode. The fuel was ammonia and the oxidant was oxygen. The cell provided an open circuit voltage of 0.60 volt and a current-voltage characteristic of 0.3 volt at 8 amps./ft.².

From the foregoing it becomes apparent that a new and improved cathode and methods of preparing the same have been herein described which meet the aforestated objectives to a remarkably unexpected extent. It is, of course, understood that such modifications, applications and alterations as may readily occur to one skilled in this art upon being confronted with the present disclosure are within the spirit of the present invention which is defined by and limited only by the scope of the claims appended hereto.

The embodiments of the invention in which an exclusive property or privilege is claimed are defined as follows:

1. A fuel cell having a housing; two electrodes mounted in said housing in spaced relation to each other; means to supply a fuel to one of said electrodes; means to supply an oxidant to the other of said electrodes; an electrolyte disposed between said electrodes; and at least one of said electrodes comprising an electrically conductive porous support having randomly dispersed thereover and in the pores thereof a boride selected from the group consisting of the borides of nickel and cobalt.

2. A fuel cell having a housing; an anode and a cathode electrode mounted in said housing in spaced relation to each other; an electrolyte disposed between said electrodes; a fuel dissolved in said electrolyte, means for supplying an oxidant to the cathode; and said cathode comprising a porous support formed of a conductive material selected from the group consisting of carbon and nickel and having a catalytic coating of boride selected from the group consisting of the borides of nickel and cobalt.

3. A fuel cell according to claim 2 in which said fuel is selected from the group consisting of methanol and ammonia.

4. A fuel cell having a housing; an anode and a cathode electrode mounted in said housing in spaced relation to each other; an electrolyte disposed between said electrodes; means for supplying a fuel to the anode and means for supplying an oxidant to the cathode; and said cathode comprising an electrically conductive porous support having randomly dispersed thereover and in the porous thereof a boride selected from the group consisting of the borides of nickel and cobalt.

References Cited by the Examiner

UNITED STATES PATENTS

| 1,255,590 | 2/10 | Ellis | 252—432 |
| 2,901,523 | 8/59 | Justi et al. | 136—86 |
| 3,113,048 | 12/63 | Thompson | 136—120 |

FOREIGN PATENTS 127,242   4/60   Russia.

OTHER REFERENCES

Chemical Abstracts, column 10, 699, 1958.

Ind. and Eng. Chemistry, vol. 44, May 1952, pages 1006–1010.

Paul et al.: Catalytic Activity of Nickel Borides, Industrial and Engineering Chemistry, vol. 44, No. 5, May 1952, pages 1006–1010.

JOHN H. MACK, *Primary Examiner.*

JOHN R. SPECK, *Examiner.*